US 9,255,558 B2

(12) United States Patent
Burke et al.

(10) Patent No.: US 9,255,558 B2
(45) Date of Patent: Feb. 9, 2016

(54) DYNAMIC VALVE SEAL ARRANGEMENT

(71) Applicant: Delavan Inc, West Des Moines, IA (US)

(72) Inventors: Travis Raymond Burke, Ankeny, IA (US); Neal Thomson, West Des Moines, IA (US); Douglas Westlake, Indianola, IA (US)

(73) Assignee: Delavan Inc, West Des Moines, IA (US)

( * ) Notice: Subject to any disclaimer, the term of this patent is extended or adjusted under 35 U.S.C. 154(b) by 205 days.

(21) Appl. No.: 13/860,206

(22) Filed: Apr. 10, 2013

(65) Prior Publication Data

US 2014/0305521 A1    Oct. 16, 2014

(51) Int. Cl.
*F16K 15/02* (2006.01)
*F02M 61/08* (2006.01)
*F23N 1/00* (2006.01)
*F23R 3/28* (2006.01)
*F16K 15/06* (2006.01)

(52) U.S. Cl.
CPC .............. *F02M 61/08* (2013.01); *F16K 15/063* (2013.01); *F23N 1/007* (2013.01); *F23R 3/283* (2013.01); *F23N 2035/24* (2013.01); *F23R 2900/00012* (2013.01); *Y10T 137/7838* (2015.04); *Y10T 137/7925* (2015.04)

(58) Field of Classification Search
CPC ............ F16K 15/063; Y10T 137/7925; Y10T 137/7929; Y10T 137/7931; F23N 1/007; F23N 2035/24
USPC ................. 137/512, 540, 541, 535, 538, 542; 251/314, 363, 361, 364; 277/553, 383, 277/434, 379, 530, 532; 267/167
See application file for complete search history.

(56) References Cited

U.S. PATENT DOCUMENTS

| 2,653,792 | A | | 9/1953 | Sacchini |
| 4,239,242 | A | | 12/1980 | Burns |
| 4,362,184 | A | * | 12/1982 | Marabeas ................ 137/516.29 |
| 5,732,730 | A | | 3/1998 | Shoemaker et al. |

OTHER PUBLICATIONS

Extended European Search Report dated Feb. 27, 2015 issued on corresponding European Patent Application No. EP 14164174.6.

* cited by examiner

*Primary Examiner* — Kevin Lee
*Assistant Examiner* — P. Macade Nichols
(74) *Attorney, Agent, or Firm* — Locke Lord LLP; Scott D. Wofsy; Joshua L. Jones

(57) ABSTRACT

A valve assembly for a fuel injector that includes a sleeve member having an interior chamber, a piston member supported for movement within the interior chamber of the sleeve member and separating an upstream pressure side of the valve assembly from a downstream pressure side of the valve assembly, and a dynamic sealing device mounted to one of the sleeve member and the piston member for sealingly isolating the upstream pressure side of the valve assembly from the downstream pressure side of the valve assembly. The dynamic sealing assembly includes a PTFE seal member having a generally C-shaped cross-section defining an internal cavity having an opening about the outer periphery thereof the seal member, and a helical spring disposed within the internal cavity of the seal member for providing a constant sealing force to the seal member. The dynamic sealing device is positioned in the valve assembly so that the opening of the internal cavity of the seal member faces away from the upstream pressure side of the valve assembly and towards the downstream pressure side of the valve assembly.

9 Claims, 3 Drawing Sheets

DYNAMIC VALVE SEAL ARRANGEMENT

BACKGROUND OF THE INVENTION

1. Field of the Invention

The subject invention relates to dynamic valve seals, and more particularly, to a dynamic seal arrangement in valve assemblies employed in the fuel injectors of gas turbine engines.

2. Description of Related Art

Check valves and schedule valves are commonly used in the fuel injectors of gas turbine engines to control fuel flow. These valves are designed to prevent the fuel system from draining on engine shutdown. They also eliminate fuel leaking into combustor on shutdown, provide consistent system pressures during operation, and contain fuel expansion, driven by elevated fuel temperatures during soak back, after engine shutdown.

Drip tight seals are required in many check valves and schedule valves (also referred to as metering valves) used in fuel injectors. Typically, drip tight seals have been made from elastomers. For example, FKM (fluoroelastomer, i.e. Viton) or FFKM (perfluoroelastomer, i.e. Kalrez) have been used when engine operating conditions reach temperatures above 350° F. Elastomers are commonly used as o-rings or as molded seals attached to metallic components.

The elastomer used for a valve seal is typically the material which limits the allowable operating temperature of the valve. High temperatures degrade the elastomer (faster aging with higher temperature). Degraded elastomers tend to stick to metal and take on a permanent set. Cold temperature shrink the elastomer and prevent it from forming a tight seal.

In most prior art check valves and schedule valve, the sealing surfaces move away from the seal as the valve opens. The elastomer seal is typically trapped in or molded to one of the valve components to prevent it from moving out of position. When the valve closes, the seal surface moves back to the elastomer and the leak proof seal is re-formed.

Spring energized PTFE seals are also used in fuel injectors. In such instances, they are typically positioned to allow system pressure to expand the inside of the seal. Moreover, the internal pressure on the PTFE would open the seal as the valve opens and possibly deform/extrude the PTFE seal. The normal position of the seal may work for relatively low pressure valves, but an extrusion failure mode may always be possible. Given these factors, using a spring energized PTFE seal in its normal orientation, as a dynamic valve seal would be problematic.

The solution to this problem, as provided by the subject invention, is to use the spring energized PTFE seal in a backwards orientation, facing the internal cavity of the seal towards the downstream pressure side of the valve assembly. This prevents the internal pressure from deforming the PTFE. By replacing a typical elastomeric o-ring seal with a spring energize PTFE seal, the temperature capability of the valve assembly can be greatly increased. Moreover, the likelihood of a thermal permanent set on a PTFE seal when compared to an elastomeric seal is reduced significantly due to the hardness of the seal material.

SUMMARY OF THE INVENTION

The subject invention is directed to a new and useful valve assembly for a fuel injector used I gas turbine engines. The valve assembly includes a sleeve member having an interior chamber and a piston member supported for movement within the interior chamber of the sleeve member. The piston member has a head portion that delimits or otherwise defines the boundaries of an upstream pressure side of the valve assembly and a downstream pressure side of the valve assembly. A dynamic sealing device is mounted to one of the sleeve member and the piston member for sealingly isolating the upstream pressure side of the valve assembly from the downstream pressure side of the valve assembly.

The dynamic sealing device includes a seal member having a generally C-shaped cross-section which defines an internal cavity having an opening about the outer periphery thereof. A spring member is disposed within the internal cavity of the seal member for providing a constant sealing force to the seal member. The dynamic sealing device is positioned in the valve assembly so that the opening of the internal cavity of the seal member faces towards the downstream pressure side of the valve assembly.

In one embodiment of the subject invention, the sleeve member and piston member are adapted and configured to operate as a check valve. In another embodiment of the subject invention, the sleeve member and piston member are adapted and configured to operate as a schedule valve. In yet another embodiment of the subject invention, the sleeve member and piston member are adapted and configured to operate as a combined check valve and schedule valve, referred to herein as an integral valve.

In a check valve assembly, an axial collar secures the sealing device in a seat formed in a head portion of the piston member. In a schedule valve assembly, a threaded retainer secures the sealing device in a seat formed in a head portion of the piston member of the schedule valve. In a combined check valve and schedule valve assembly, a surrounding retainer ring secures the sealing device in a seat formed in a head portion of the piston member.

Preferably, the seal member is formed from polytetrafluoroethylene (PTFE), which is a synthetic fluoropolymer of tetrafluoroethylene. The best known brand name of PTFE is Teflon®, which sold by DuPont. It is envisioned that other material may also be used to form the seal member, including for example, PTFE containing an additive such as carbon, carbon fiber or the like. The seal member includes exterior surface features for engaging corresponding surface features on the sleeve member and/or exterior surface features for engaging corresponding surface features on the piston member. The spring member is a metallic spring, and it is preferably configured as a helically wound metallic spring. Other springs may also be utilized without departing from the spirit or scope of the subject disclosure.

The subject invention is also directed to a check valve assembly for a fuel injector of a gas turbine engine, which includes a sleeve member having an interior chamber and a piston member supported for movement within the interior chamber of the sleeve member. The piston member has a head portion that separates an upstream pressure side of the check valve assembly from a downstream pressure side of the check valve assembly. A dynamic sealing device is secured to the head portion of the piston member for sealingly isolating the upstream pressure side of the check valve assembly from the downstream pressure side of the check valve assembly.

The dynamic sealing assembly includes a seal having a generally C-shaped cross-section formed from PTFE and defining an internal cavity having an opening about the outer periphery thereof. A metallic helical spring is disposed within the internal cavity of the seal member to provide a constant sealing force to the seal member. The dynamic sealing device is positioned in the check valve assembly so that the opening of the internal cavity of the seal member faces away from the upstream pressure side of the check valve assembly.

The subject invention is also directed to a schedule valve assembly for a fuel injector of a gas turbine engine, which includes a sleeve member having an interior chamber and a piston member supported for movement within the interior chamber of the sleeve member. The piston member has a head portion that separates an upstream pressure side of the schedule valve assembly from a downstream pressure side of the schedule valve assembly. A dynamic sealing device is secured to the head portion of the piston member for sealingly isolating the upstream pressure side of the schedule valve assembly from the downstream pressure side of the schedule valve assembly.

The dynamic sealing device includes a seal member having a generally C-shaped cross-section formed from PTFE and defining an internal cavity having an opening about the outer periphery thereof. A metallic helical spring is disposed within the internal cavity of the seal member to provide a constant sealing force to the seal member. The dynamic sealing device is positioned in the schedule valve assembly so that the opening of the internal cavity of the seal member faces way from the upstream pressure side of the schedule valve assembly.

These and other features of the dynamic valve seal of the subject invention and the manner in which it is employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the dynamic valve seal of subject invention without undue experimentation, preferred embodiments thereof will be described in detail herein below with reference to certain figures, wherein.

DETAILED DESCRIPTION OF PREFERRED EMBODIMENTS

Figure 1:
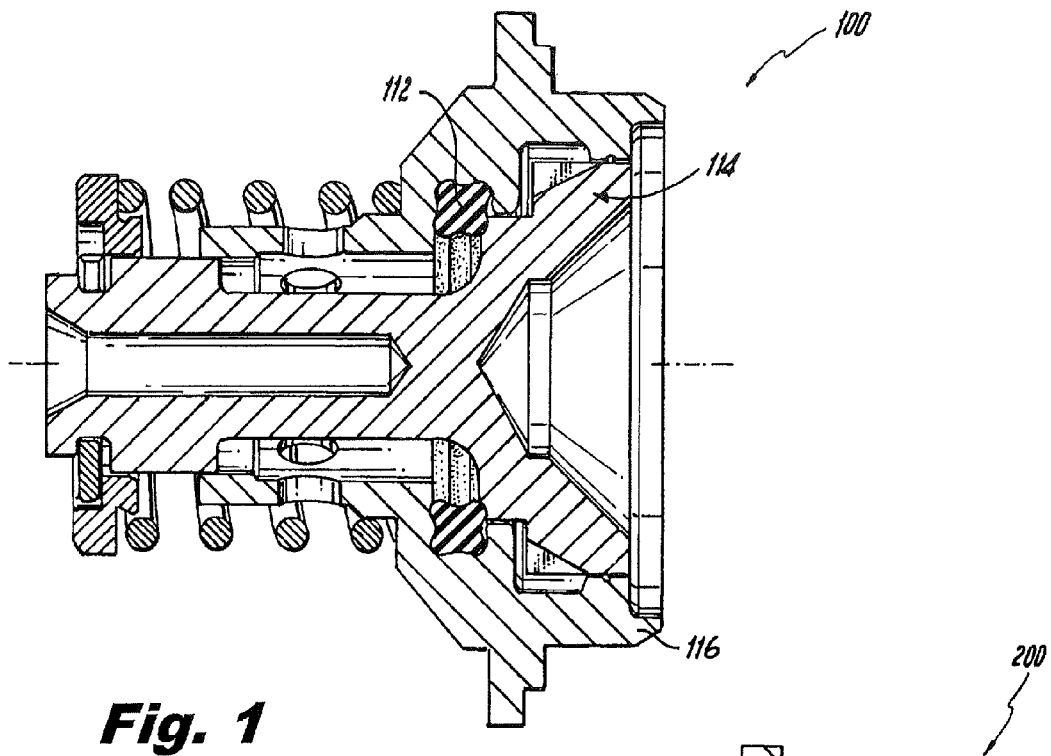
FIG. 1 is a side elevational view, in cross-section of a prior art check valve with an elastomer quad ring seal associated with the piston member for isolating the upstream pressure side of the valve from the downstream pressure side of the valve.

Referring now to the drawings, wherein like reference numerals identify similar structural features or aspects of the subject invention, there is illustrated in FIG. 1 a prior art check valve assembly designated generally by reference numeral 100. Valve assembly 100 includes an elastomer quad ring seal 112 that is associated with a piston member 114 disposed in a sleeve member 116. The quad ring seal 112 sealingly isolates the upstream pressure side of the valve assembly 100 from the downstream pressure side of the valve assembly 100. Check valve assembly 100 is used to control the flow of fuel through a single stage fuel injector of a gas turbine engine. The elastomer quad ring seal 112 limits the allowable operating temperature of the valve assembly 100.

Figure 2:
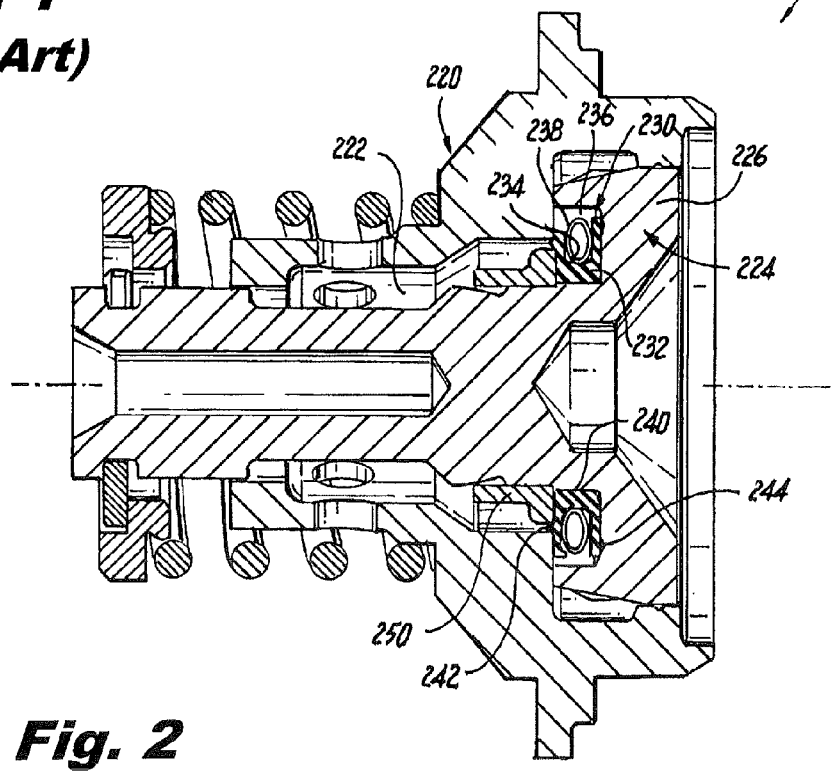
FIG. 2 is a side elevational view, in cross-section a check valve with a spring energized PTFE seal that is configured and arranged in accordance with the subject invention.

In contrast to the prior art check valve assembly 100 shown in FIG. 1, there is illustrated in FIG. 2 a check valve assembly constructed in accordance with a preferred embodiment of the subject invention and designated generally by reference numeral 200. Check valve assembly 200 includes a sleeve member 220 having an interior chamber 222, and a piston member 224 supported for movement within the interior chamber 222 of the sleeve member 220. The piston member 224 has a head portion 226 that separates or otherwise delimits an upstream pressure side of the check valve assembly 200 and a downstream pressure side of the check valve assembly 200.

A dynamic sealing device 230 is mounted to the piston member 224 for sealingly isolating the upstream pressure side of the valve assembly 200 from the downstream pressure side of the valve assembly 200. Those skilled in the art will readily appreciate that the dynamic sealing device 230 can alternatively be mounted to the sleeve member 220 depending upon the application.

With continuing reference to FIG. 2, the dynamic sealing device 230 includes a seal member 232 having a generally C-shaped cross-section that defines an internal cavity 234 having an opening 236 about the outer periphery thereof. A spring member 238 is disposed within the internal cavity 234 of the seal member 232 to provide a constant sealing force to the seal member 232.

The dynamic sealing device 230 is positioned in the check valve assembly 200 so that the opening 236 of the internal cavity 234 of the seal member 230 faces towards the downstream pressure side of the valve assembly 200. In this position, the sealing device 230 is more resistant to back pressure. Furthermore, with the opening 236 of cavity 234 facing away from the upstream pressure side of the check valve assembly 200, debris is unable to accumulate in the cavity 234, so long as the seal and its seat are manufactured with a slight interference fit.

An axial collar 250 secures the dynamic sealing device 230 in a seat 240 formed in a head portion 226 of the piston member 224 of the check valve assembly 200. The seal member 232 is preferably formed from PTFE (Teflon®). PTFE has a greater temperature resistance than both Viton® and Kalrez®, and has a far wider operating performance range that extends from −423° F. to 572° F. PTFE provides low friction, good wear resistance and it is chemically inert and non-aging. The shape of the PTFE seal member 232 can be varied to allow for better retention in the check valve assembly 200. In particular, the seal member 232 includes exterior surface features 242 for engaging corresponding surface features on the sleeve member 220 and/or exterior surface features 244 for engaging corresponding surface features on the piston member 224.

The spring member 238 is a metallic spring, and it is preferably a helically wound metallic spring. Other springs, including springs with a plurality fingers may also be utilized in the dynamic sealing device 230 to provide a constant sealing force to the seal member 232.

Figure 3:
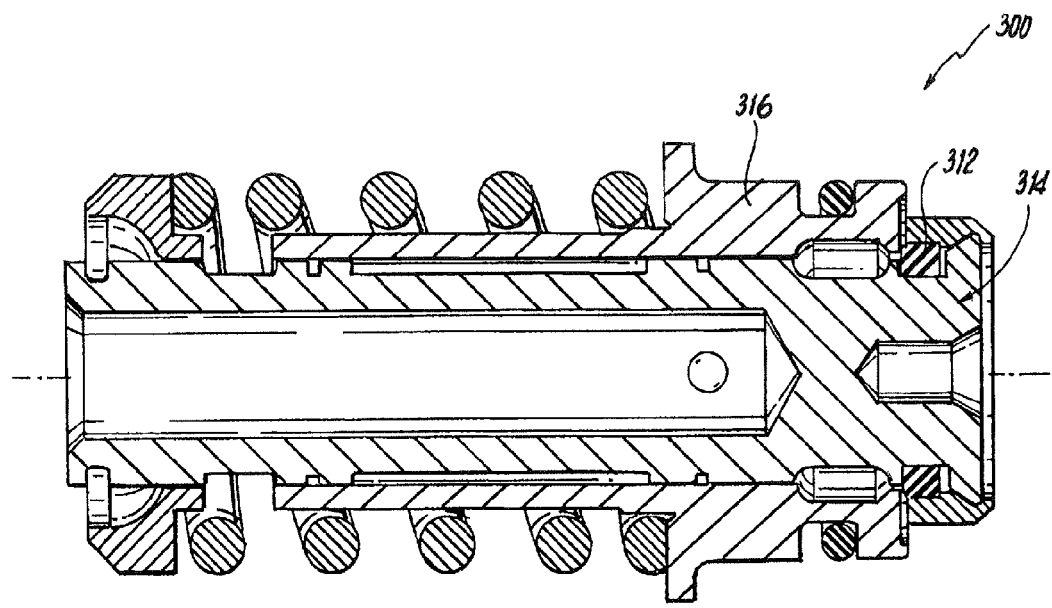
FIG. 3 is a side elevational view, in cross-section of a prior art schedule valve with an elastomer O-ring seal associated with the piston member for isolating the upstream pressure side of the valve from the downstream pressure side of the valve.

Referring to FIG. 3, there is illustrated a prior art schedule valve assembly designated generally by reference numeral 300, which includes an elastomer O-ring seal 312 associated with a piston member 314 disposed in a sleeve member 316. The o-ring seal 312 isolates the upstream pressure side of the valve assembly 300 from the downstream pressure side of the valve assembly 300. Schedule valve assembly 300 is used to meter the flow of fuel through a single stage fuel injector of a gas turbine engine. The elastomer o-ring seal 312 limits the allowable operating temperature of the schedule valve assembly 200.

Figure 4:
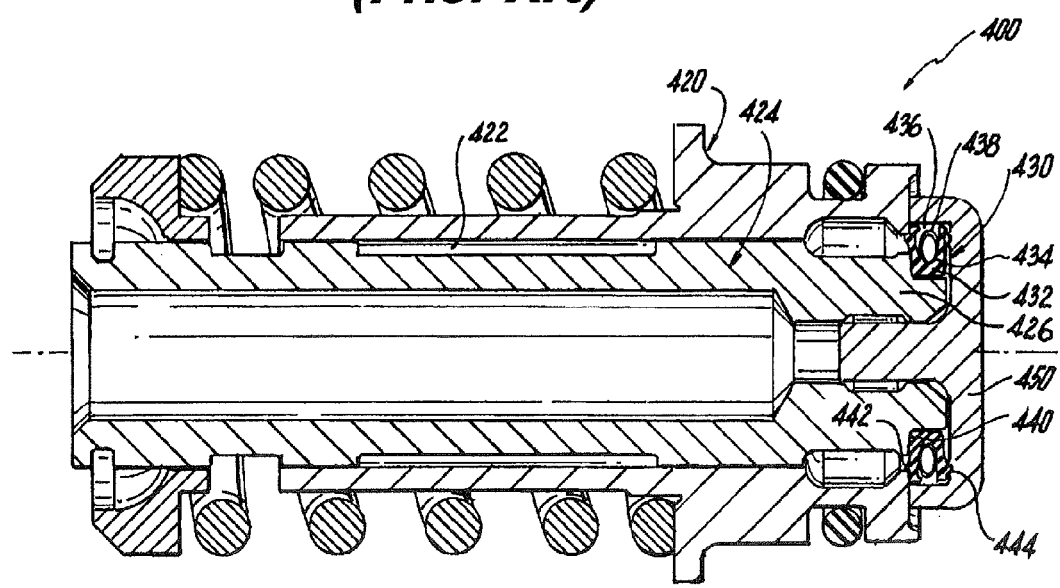
FIG. 4 is a side elevational view, in cross-section a schedule valve with a spring energized PTFE seal that is configured and arranged in accordance with the subject invention.

In contrast to the prior art schedule valve assembly 300 shown in FIG. 3, there is illustrated in FIG. 4 a schedule valve assembly constructed in accordance with a preferred embodiment of the subject invention and designated generally by reference numeral 400. Schedule valve assembly 400 includes a sleeve member 420 having an interior chamber 422, and a piston member 424 supported for movement within the interior chamber 422 of the sleeve member 420. The piston member 424 has a head portion 426 which connects to threaded retainer 450.

A dynamic sealing device 430 is mounted to the piston member 424 for sealingly isolating the upstream pressure side of the valve assembly 400 from the downstream pressure side of the valve assembly 400. Those skilled in the art will readily appreciate that the dynamic sealing device 430 can otherwise be mounted to the sleeve member 420 depending upon the application.

The dynamic sealing device 430 includes a PTFE seal member 432 having a generally C-shaped cross-section, which defines an internal cavity 434 having an opening 436 about the outer periphery thereof. A helical spring member 438 is disposed within the internal cavity 434 of the seal member 432 to provide a constant sealing force to the seal member 432. The dynamic sealing device 430 is positioned in the schedule valve assembly 400 so that the opening 436 of the internal cavity 434 of the seal member 430 faces towards the downstream pressure side of the valve assembly 400.

A threaded retainer 450 secures the sealing device 430 in a seat 440 formed in a head portion 426 of the piston member 424 of the schedule valve assembly 400. Threaded retainer 450 and a head portion 426 of the piston member 424 separate an upstream pressure side of the schedule valve assembly 400 from a downstream pressure side of the schedule valve assembly 400. The seal member 432 includes exterior surface features 442 for engaging corresponding surface features on the sleeve member 420 and/or exterior surface features 444 for engaging corresponding surface features on the piston member 424.

Figure 5:
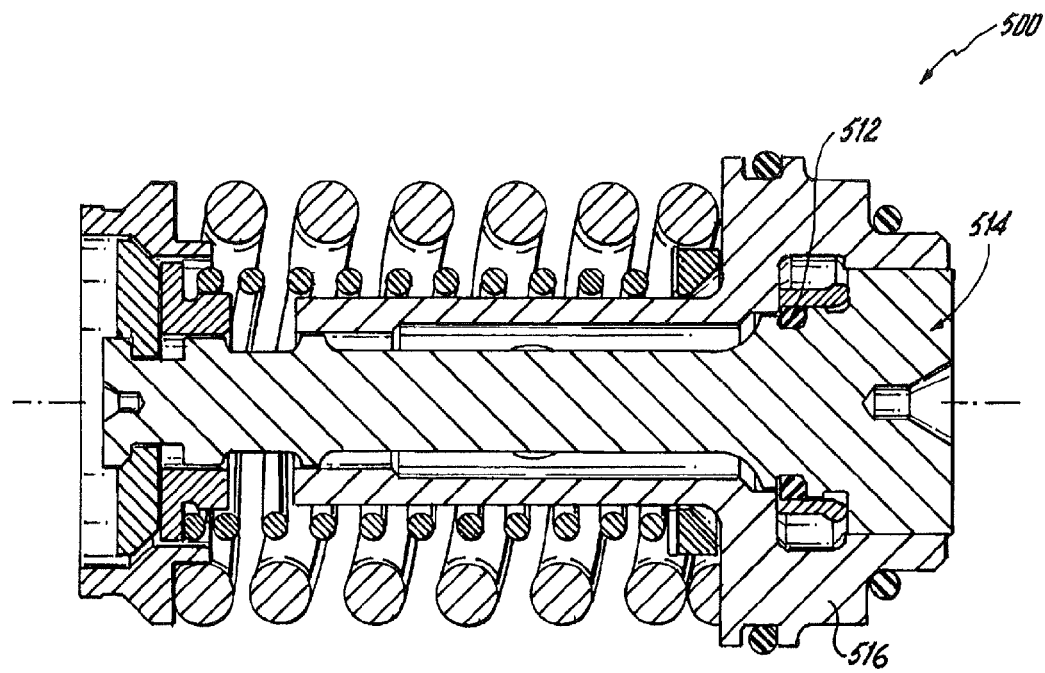
FIG. 5 is a side elevational view, in cross-section of a prior art integral valve in the form of a combined schedule valve and check valve, which has an elastomer O-ring seal associated with the piston member for isolating the upstream pressure side of the valve from the downstream pressure side of the valve.

Referring now to FIG. 5, there is a prior art integral valve assembly in the form of a combined schedule valve and check valve, which is designated generally by reference numeral 500. This type of valve is often used in a two stage fuel injector having a main fuel path and a pilot fuel path. Integral valve assembly 500 includes an elastomer O-ring seal 512 associated with a piston member 514 disposed in a sleeve member 516. The o-ring seal 512 isolates the upstream pressure side of the integral valve assembly 500 from the downstream pressure side of the integral valve assembly 500. Another example of a prior art combined check valve and metering valve assembly that employs elastomer o-ring seal is disclosed in commonly assigned U.S. Pat. No. 5,732,730, to Shoemaker et al., the disclosure of which is herein incorporated by reference in its entirety. The elastomer o-ring seals used in these prior art devices tend to limit the allowable operating temperature of the schedule valve assembly 500.

Figure 6:
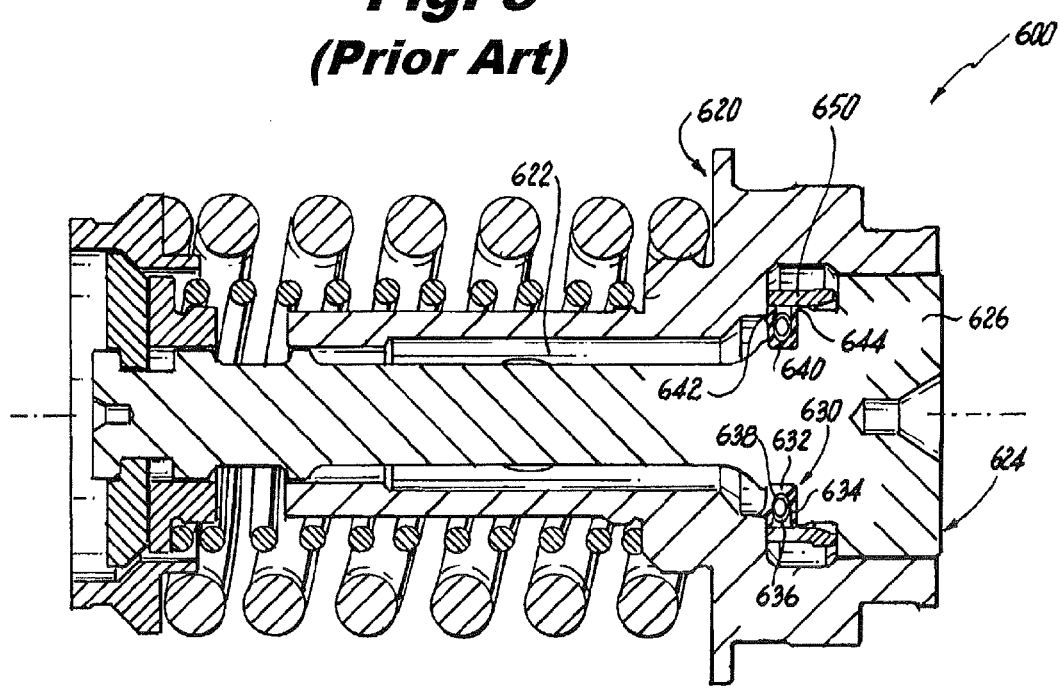
FIG. 6 is a side elevational view, in cross-section an integral valve with a spring energized PTFE seal arranged in accordance with the subject invention.

In contrast to the prior art integral valve assembly 500 shown in FIG. 5, there is illustrated in FIG. 6 an integral valve assembly constructed in accordance with a preferred embodiment of the subject invention and designated generally by reference numeral 600. Integral valve assembly 600 includes a sleeve member 620 having an interior chamber 622, and a piston member 624 supported for movement within the interior chamber 622 of the sleeve member 620. The piston member 624 has a head portion 626 that separates an upstream pressure side of the integral valve assembly 600 from a downstream pressure side of the integral valve assembly 600.

A dynamic sealing device 630 is mounted to the piston member 624 for sealingly isolating the upstream pressure side of the valve assembly 600 from the downstream pressure side of the valve assembly 600. Those skilled in the art will readily appreciate that the dynamic sealing device 630 can instead be mounted to the sleeve member 620.

The dynamic sealing device 630 includes a spring energized PTFE seal member 632 having a generally C-shaped cross-section that defines an internal cavity 634 having an opening 636 about the outer periphery thereof. A helical metallic spring member 638 is disposed within the internal cavity 634 of the seal member 632 for providing a constant sealing force to the seal member 632.

The dynamic sealing device 630 is positioned in the integral valve assembly 600 in such a manner so that the opening 636 of the internal cavity 634 of the seal member 630 faces towards the downstream pressure side of the valve assembly 600 an away from the upstream pressure side of the valve assembly. A retainer ring 650 surrounds the sealing device 630 to secure it in a seat 640 formed in a head portion 626 of the piston member 624 of the schedule valve assembly 600. The seal member 632 includes exterior surface features 642 for engaging corresponding surface features on the sleeve member 620 and/or exterior surface features 644 for engaging corresponding surface features on the piston member 624.

While the dynamic valve seal of the subject invention has been shown and described with reference to preferred embodiments, those skilled in the art will readily appreciate that various changes and/or modifications may be made thereto without departing from the spirit and scope of the subject invention as defined by the appended claims.

What is claimed is:

1. A valve assembly for a fuel injector comprising:
   a) a sleeve member having an interior chamber;
   b) a piston member supported for movement within the interior chamber of the sleeve member and having a head portion delimiting an upstream pressure side of the valve assembly and a downstream pressure side of the valve assembly; and
   c) a dynamic sealing device mounted to the piston member for sealingly isolating the upstream pressure side of the valve assembly from the downstream pressure side of the valve assembly, the dynamic sealing device including:
      i) a seal member having a generally C-shaped cross-section and defining an internal cavity having an opening about the outer periphery of the seal member; and
      ii) a spring member disposed within the internal cavity of the seal member for providing a constant sealing force to the seal member, wherein the dynamic sealing device is secured in a seat formed in the head portion of the piston member by a threaded retainer that is separate from the piston member and the dynamic sealing device is positioned in the valve assembly so that the opening of the internal cavity of the seal member faces towards the downstream pressure side of the valve assembly, and wherein the sleeve member and piston member are adapted and configured to operate as a schedule valve.

2. A valve assembly as recited in claim 1, wherein the seal member is formed from PTFE.

3. A valve assembly as recited in claim 1, wherein the seal member includes exterior surface features for engaging corresponding surface features on the sleeve member.

4. A valve assembly as recited in claim 1, wherein the seal member includes exterior surface features for engaging corresponding surface features on the piston member.

5. A valve assembly as recited in claim 1, wherein the spring member is a metallic spring.

6. A valve assembly as recited in claim 1, wherein the spring member is a helically wound metallic spring.

7. A schedule valve assembly for a fuel injector comprising:
 a) a sleeve member having an interior chamber;
 b) a piston member supported for movement within the interior chamber of the sleeve member and having a head portion separating an upstream pressure side of the schedule valve assembly from a downstream pressure side of the schedule valve assembly; and
 c) a dynamic sealing device secured to the piston member for sealingly isolating the upstream pressure side of the schedule valve assembly from the downstream pressure side of the schedule valve assembly, the dynamic sealing device including:
  i) a seal member having a generally C-shaped cross-section formed from PTFE and defining an internal cavity having an opening about the outer periphery of the seal member; and
  ii) a metallic helical spring disposed within the internal cavity of the seal member for providing a constant sealing force to the seal member, wherein the dynamic sealing device is secured in a seat formed in the head portion of the piston member by a threaded retainer that is separate from the piston member and the dynamic sealing device is positioned in the schedule valve assembly so that the opening of the internal cavity of the seal member faces away from the upstream pressure side of the schedule valve assembly.

8. A schedule valve assembly as recited in claim 7, wherein the seal member includes exterior surface features for engaging corresponding surface features on the sleeve member.

9. A schedule valve assembly as recited in claim 7, wherein the seal member includes exterior surface features for engaging corresponding surface features on the piston member.

* * * * *